United States Patent [19]

Sakaguchi

[11] Patent Number: 5,239,422

[45] Date of Patent: Aug. 24, 1993

[54] ROTARY HEAD TYPE DIGITAL MAGNETIC RECORDING-REPRODUCING APPARATUS

[75] Inventor: Shozaburo Sakaguchi, Saitama, Japan

[73] Assignee: Pioneer Electronic Corporation, Tokyo, Japan

[21] Appl. No.: 911,381

[22] Filed: Jul. 13, 1992

Related U.S. Application Data

[63] Continuation of Ser. No. 515,893, Apr. 27, 1990, abandoned.

[30] Foreign Application Priority Data

Apr. 28, 1989 [JP] Japan .................................. 1-107876

[51] Int. Cl.$^5$ .............................................. H04N 5/78
[52] U.S. Cl. ...................................... 360/38.1; 360/64
[58] Field of Search ..................... 360/38.1, 128, 64; 358/314, 336

[56] References Cited

U.S. PATENT DOCUMENTS

| 4,137,547 | 1/1979 | Yamamitsu et al. | 358/314 |
| 4,323,934 | 4/1982 | Giraud | 360/27 |
| 4,591,925 | 5/1986 | Trytko | 360/38.1 X |
| 4,623,994 | 11/1986 | Nabeshima et al. | 360/38.1 |
| 4,685,004 | 8/1987 | Takahashi et al. | 360/48 |
| 4,692,914 | 9/1987 | Yasumura et al. | 360/38.1 |
| 4,719,522 | 1/1988 | Kaneko et al. | 360/38.1 |
| 5,050,002 | 9/1991 | Suzuki et al. | 360/38.1 |

Primary Examiner—Aristotelis Psitos
Assistant Examiner—Varsha V. Sheladia
Attorney, Agent, or Firm—Sughrue, Mion, Zinn, Macpeak & Seas

[57] ABSTRACT

A rotary digital magnetic recording-reproducing apparatus includes an envelope detecting unit and a one-of-heads jamming detector. The envelope detector receives an RF signal, reproduced through two heads, having first envelopes indicative of a first head and a second envelope indicative of a second head. The envelope detecting unit produces from the RF signal a train of pulses indicative of the first and second envelopes. The one-of-heads jamming detector monitors the train of pulses to output a signal indicative of the trouble or jamming of one of the first and second heads when an envelope corresponding to one of the first and second heads is lost.

16 Claims, 3 Drawing Sheets

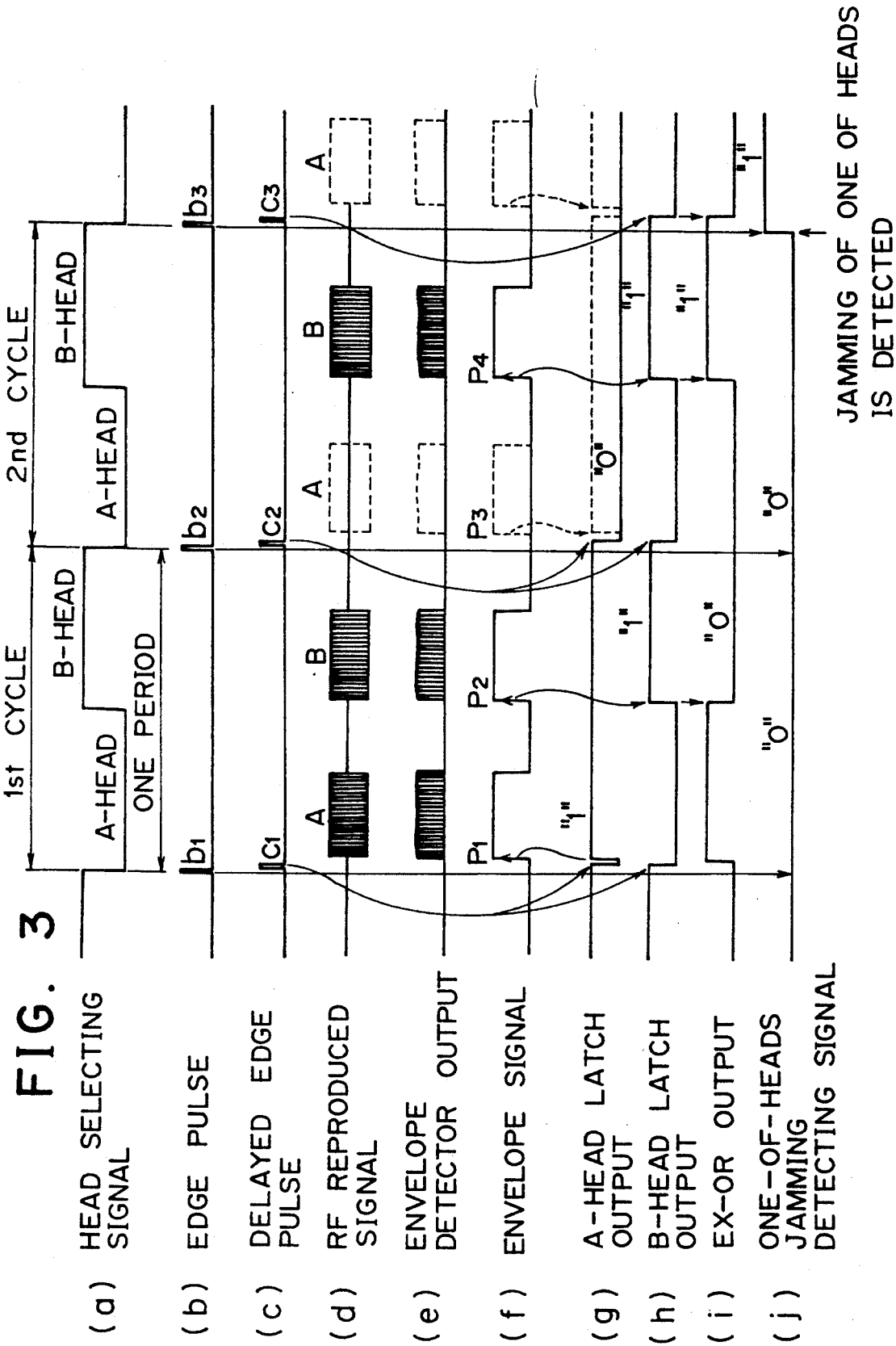

ROTARY HEAD TYPE DIGITAL MAGNETIC RECORDING-REPRODUCING APPARATUS

This is a continuation of U.S. application No. 07/515,893 filed Apr. 27, 1990, now abandoned.

BACKGROUND OF THE INVENTION

1. Field of the Invention

The present invention relates to a rotary head type digital magnetic recording/reproducing apparatus which is the so-called R-DAT or rotary head type digital audio tape recorder.

2. Prior Art

A magnetic head has an extremely narrow air gap through which information recorded on a magnetic storage medium is picked up. The air gap can often be jammed by dust or dirt causing difficulty in reading the information from the magnetic storage medium. An R-DAT employs the so-called interleave of two-track type, in which when one of two heads fails to normally operate due to head-jamming, the information lost may be recovered by a normally operating head through the interpolation process.

A similar problem may also occur in VTR in which the recording operation is performed by the use of rotary heads similar to that in R-DAT. The head trouble influences directly the quality of the picture on the screen, from which the user may become aware of the trouble.

In R-DAT, however, the audio signal can still be reproduced even if one of the two heads fails to normally operate, thus it is difficult for the user to become aware of the trouble of head. The failure of the head causes the degradation of tracking performance of the rotary head which leads to an increase in error rate; hence possibility of muting and degradation of sound quality. It is preferable that the users are alarmed of the trouble and are urged to clean the affected head.

SUMMARY OF THE INVENTION

The present invention was made to overcome the aforementioned drawbacks and an object of the invention is to provide an R-DAT in which the head jamming can be readily detected.

A rotary magnetic head according to the invention reproduces through two heads a train of RF signal in which the signal from one of the heads appears alternately with the signal from the other. An envelope detecting unit extracts the envelopes of the reproduced RF signal to produce a train of pulses in which the pulse indicative of one of the heads appears alternately with the pulse indicative of the other. The train of pulses are then monitored by a one-of-heads jamming detector. When any one of the envelopes is lost, the one-of-heads jamming detector outputs a signal indicative that one of the two heads fails to normally operate.

BRIEF DESCRIPTION OF THE DRAWINGS

Features and other objects of the invention will be more apparent from the description of the preferred embodiments with reference to the accompanying drawings in which:

FIG. 3a–j illustrates waveforms of various parts of the detector in FIG. 2.

DESCRIPTION OF THE PREFERRED EMBODIMENTS

Embodiments

Figure 1:
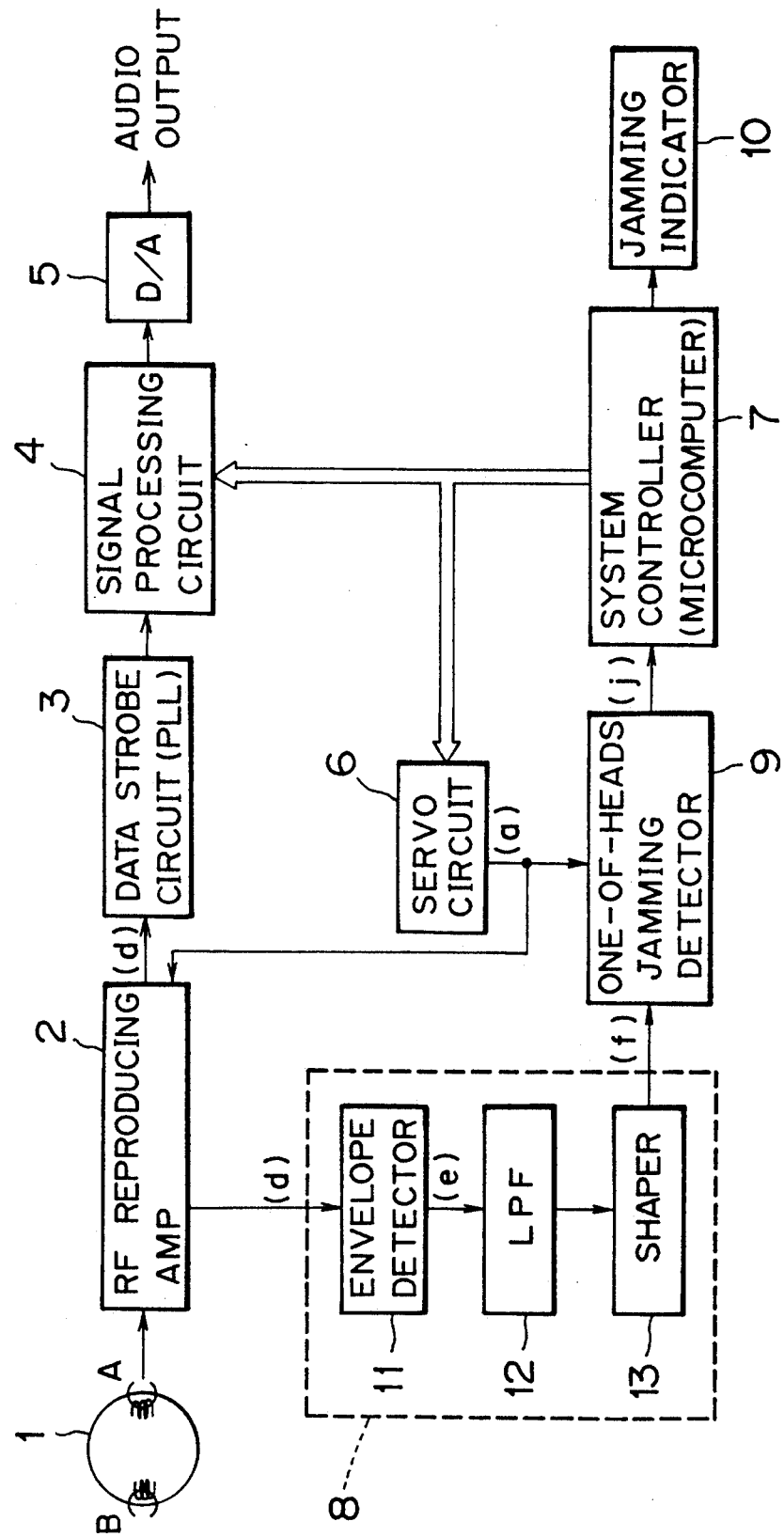
FIG. 1 is a block diagram of an embodiment of a rotary head digital magnetic recording-reproducing apparatus according to the present invention.

FIG. 1 shows an embodiment of a rotary head type digital audio tape recorder according to the present invention, which is formed of an RF reproducing amplifier 2, heads A and B mounted on a rotary drum 1, a data strobe circuit 3, a signal processing circuit 4, a D/A converter 5, a servo circuit 6, and a system controller 7. This signal reproducing system is of well known construction in the art. The two heads A and B reproduce a train of RF signal in which the signal from one head appears alternately with the signal from the other head with a time interval therebetween as depicted by a signal d in FIG. 3.

The RF reproduced signal which is read in through the two heads A and B is supplied through the RF reproducing amplifier 2 to the data strobe circuit 3 by which information such as a clock signal and data is obtained. Thereafter, the information is supplied to the signal processing circuit 4 which performs under control of the controller 7 various processing such as the demodulation of data, interleave, and error correction and interpolation to reproduce original digital signals. Then, the output of the signal processing circuit 4 is directed to the D/A converter 5 which converts the digital input signal thereto into an analog signal to provide an audio signal.

The signals a–j in FIG. 3 represent the waveforms at locations a–j in a later described one-of-heads jamming detector 9 in FIG. 2. The reproduced RF signal outputted from the RF reproducing amplifier 2 is of the waveform depicted by the signal d in FIG. 3. The reproduced RF signal is supplied to the envelope detector 11 in an envelop detecting unit 8 which rectifies the RF signal into a train of upper half cycles e which represent the A head and B head. The train of upper half cycles is then directed to the low-pass filter 12 which removes the high frequency components contained in the upper half cycles. The output of the low-pass filter 12 is fed to the shaper 13 which produces a train of pulse waveforms corresponding to the train of half cycles e. Then the train of pulse waveforms is outputted as an envelope signal f to the one-of-heads jamming detector 9.

The one-of-heads jamming detector 9 monitors in timed relation with the head selection signal a the envelope signal f so as to make a decision based on whether or not the envelope components of both the A and B heads are existing in the envelope signal. If the absence of components of any one of the heads is detected, the affected head is regarded as not operating normally and the one-of-heads jamming detector 9 outputs a detection signal j in FIG. 3.

The system controller 7 displays the occurrence of the trouble by means of an LED on the jamming indicator 10 so that the user who is alarmed of the trouble calls a serviceman.

Figure 2:
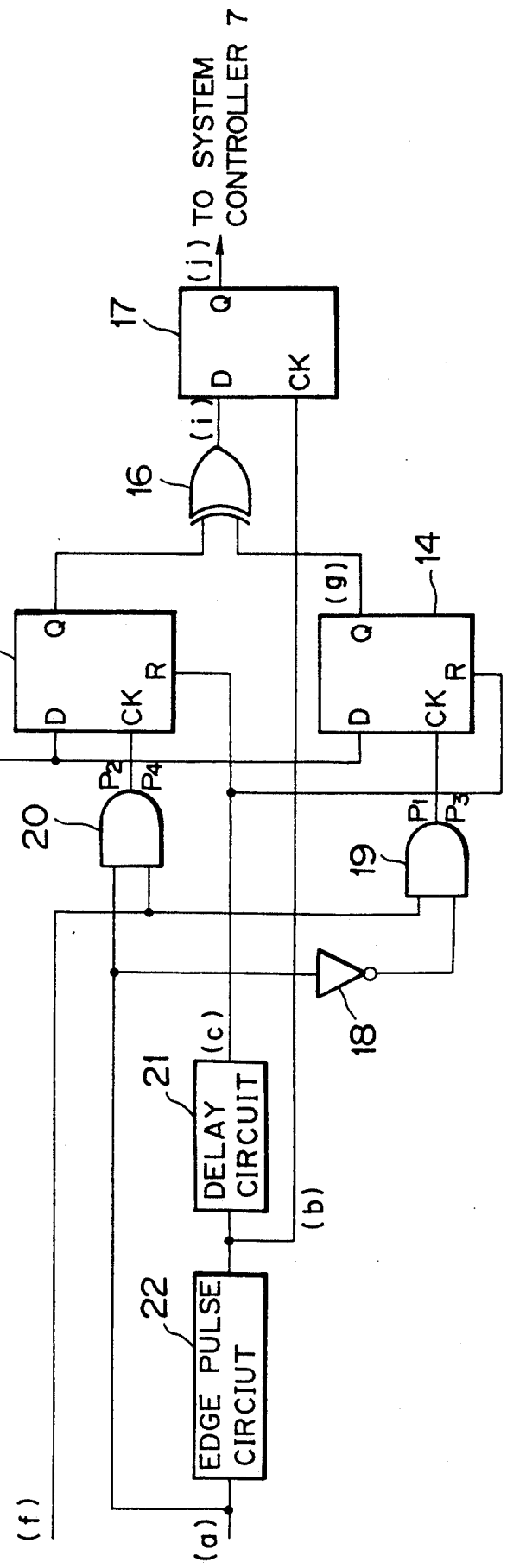
FIG. 2 shows a specific circuit example of a one-of-heads jamming detector.

FIG. 2 illustrates a specific circuit example of the jamming detector 9 described above. The head-selecting signal a and the envelope signal f are ANDed by an AND gate 20 which outputs an output to the clock terminal CK of the B head latch 15. The head-selecting signal a inverted by the inverter 18 and the envelope signal f are ANDed by an AND gate 19 which outputs an output to the clock terminal CK of the A-head latch 14. Through these AND gates 19 and 20, the odd-numbered signals P1, P3, ... of the envelope signal f are directed to the CK terminal of the A-head latch 14 and the even-numbered signals P2, P4, ... to the CK terminal of the B-head latch 15. The signal a is also supplied to an edge pulse producing circuit 22 which produces an edge pulse b in FIG. 3 in synchronism with the falling edge of the head selecting signal a. The edge pulse b is then supplied to a delay circuit 21 which produces a delayed edge pulse c having a predetermined amount of delay time.

The edge pulse b is inputted to the clock terminal CK of the one-of-heads jamming latch 17 while the delayed edge pulse c is supplied to the reset terminals R of the A head latch 14 and of the B head latch 15. The input terminals D of the latches 14 and 15 are connected to an H level or logic 1.

The outputs of the B-head latch 15 and the A-head latch 14 are supplied to the inputs of the EX-OR gate 16 which provides an output i if one of the outputs from the latches 15 and 14 is logic 0 while the other is logic 1. This output i is latched by the one-of-heads jamming latch 17 upon the edge pulse b directed to the clock terminal CK thereof, thus producing a detection signal j at the output of the latch 17.

OPERATION

When the two heads are both normally operating in the 1st cycle, the respective waveform of the RF signal reproduced by the A head and B head appears alternately with one another at a predetermined time interval in the order of A, B, A, B ..., as depicted by the RF reproduced signal d. At the beginning of one period of the head selecting signal a, the latches 14 and 15 are reset to their initial states or logic 0 by the delayed pulse c1. When neither the A-head nor the B-head is jammed, the A-head latch 14 latches the H level, applied to the input terminal D thereof, at the rising edge P1 of the envelope signal f in FIG. 3 to output the signal g of a logic 1. In the mean time, the B-head latch 15 latches the H level, applied to the input terminal D thereof, at the rising edge P2 of the envelope signal f to output the signal h of a logic 1. The outputs from the latches 14 and 15 are supplied to the EX-OR gate. Since the two inputs to the EX-OR gate 16 are logic 1, the gate 16 outputs a logic 0 which is latched by the latch 17 upon the edge pulse b2. Thus, the output of the one-of-heads jamming detector 9 is held logic 0 at all times if both the A-head and the B-head are normally operating. At the end of one period of the head selecting signal a, the latches 14 and 15 are reset to their initial state or logic 0 by the delayed pulse c2. Thereafter, the aforementioned detecting operation is performed repeatedly for each rotation of the heads.

Consider a case in which the A head fails to normally operate in the 2nd cycle of the rotation of the rotary drum. When the A head fails to normally operate, the RF reproduced signal in dotted lines will be lost and only the waveforms depicted in solid lines will be left. Thus, the rising edge P3 in the envelope signal is lost. This causes the latch 14 to be unable to latch the H level applied to the input terminal D thereof but to maintain logic 0. In the mean time, the latch 15 latches the H level at the rising edge P4 of the envelope signal f to output a logic 1 as depicted by h. Thus, the EX-OR gate 16 outputs at the timing P4 an output of logic 1 which in turn is latched by the latch 17 upon the edge pulse b3.

As a result, the output j of the one-of-heads jamming detector 9 becomes a logic 1 if the A-head fails to operate normally.

what is claimed is:

1. A rotary digital magnetic recording-reproducing apparatus comprising:
   envelope-detecting means for detecting envelopes of an RF signal reproduced from a magnetic storage medium through first and second heads mounted on a rotary drum, said envelopes including a first envelope representing an RF signal reproduced through said first head and a second envelope representing an RF signal reproduced through said second head, said first envelope appearing alternatively with said second envelope; and
   jamming detecting means for accepting said envelopes as inputs and outputting a warning signal when at least one of said envelopes is absent from said inputs for at least one rotation cycle of said rotary drum, said jamming detecting means including:
   detector means for outputting first and second trigger signals every time said first and second envelopes, respectively, are detected,
   latch means for outputting first and second latch signals immediately after receiving said first and second trigger signals, respectively, said latch means being reset after each of said rotation cycles, and
   means for outputting said warning signal only when said first and second latch signals differ from one another at an end of said rotation cycle.

2. A rotary digital magnetic recording-reproducing apparatus according to claim 1, wherein said jamming detecting means further includes:
   a first gate circuit for outputting said first trigger signal indicative of envelopes which represent said first head;
   a second gate circuit for outputting said second trigger signal indicative of envelopes which represent said second head, said first and second gate circuits accepting said envelopes of said RF signal as inputs;
   means for generating a first signal indicative of said end of each rotation of said rotary drum and a second signal a predetermined length of time thereafter;
   a first latch for outputting said first latch signal when triggered by said first trigger signal, said first latch being reset by said second signal;
   a second latch for outputting said second latch signal when triggered by said second trigger signal, said second latch being reset by said second signal;
   a third gate circuit for generating an output equaling a logic 1 only when one of said first and second latch signals equals a logic 0;
   a third latch for latching the output of said third gate to provide a third output as said warning signal when triggered by said first signal, said third output equally a logic 1 indicating trouble with said first and second heads when at least one of said envelopes is lost and equally a logic 0 indicating normal operation of said first and second heads.

3. A rotary digital magnetic recording-reproducing apparatus according to claim 1, wherein said jamming detecting means includes:

a circuit to determine when said drum completes a revolution without generating an envelope signal for each of said first and second heads.

4. A rotary digital magnetic recording-reproducing apparatus, according to claim 1, further comprising:
means for generating an edge pulse at a beginning of each rotation cycle in order to trigger said means for outputting said warning signal to output said warning signal when said first and second latch outputs are different at a time that said edge pulse occurs.

5. A rotary digital magnetic recording-reproducing apparatus, according to claim 1, further comprising:
means for producing a delayed edge pulse shortly after said end of said rotation cycle, wherein said detector means is reset by said delayed edge pulse in order that said detector means maintains said first and second latch signals until shortly after said end of said rotation cycle.

6. A rotary digital magnetic recording-reproducing apparatus, according to claim 1, wherein said envelope detecting means includes:
means for receiving said RF signal and generating a train of waveforms from low frequency components of said RF signal as said first and second envelopes in said envelope signal.

7. A rotary digital magnetic recording-reproducing apparatus, according to claim 1, wherein said first and second envelopes only represent low frequency components in said RF signal reproduced by said first and second heads, respectively.

8. A rotary digital magnetic recording-reproducing apparatus, according to claim 1, wherein said envelope detecting means further includes a low pass filter for passing only low frequency components of said RF signal output by said first and second heads, said first and second envelopes being based only on said low frequency components.

9. A rotary digital magnetic recording-reproducing apparatus having first and second heads mounted on a rotary drum, said apparatus comprising:
a servo circuit for generating a head selection signal indicating which one of said first and second heads is selected;
an envelope detecting unit for detecting first and second envelopes of an RF signal reproduced by said first and second heads, respectively, and outputting an envelope signal which alternatively includes said first and second envelopes;
a jam detector for receiving and monitoring said first and second envelope signals in timed relation with said head selection signal, said jam detector including latch means for outputting a detection signal when at least one of said first and second envelopes is absent from said envelope signal during a rotation cycle of said rotary drum.

10. A rotary digital magnetic recording-reproducing apparatus according to claim 9, wherein said envelope-detecting unit includes:
means for rectifying said RF signal into a train of upper half cycles;
a low pass filter for removing high frequency components from within said train of upper half cycles and outputting low frequency components thereof; and
a shaper for generating a train of pulse waveforms from said low frequency components as said first and second envelopes in said envelope signal.

11. A rotary digital magnetic recording-reproducing apparatus according to claim 9, wherein said jam detector includes:
a first latch for outputting a first output when said first envelope is present in said envelope signal;
a second latch for outputting a second output when said second envelope is present in said envelope signal;
a third latch for outputting said detection signal when said drum completes a revolution and at least one of said first and second latches does not output said first and second respective outputs.

12. A rotary digital magnetic recording-reproducing apparatus according to claim 9, wherein said jam detector generates said detection signal simultaneously with the switching of said head selection signal from one head to another.

13. A rotary digital magnetic recording-reproducing apparatus, according to claim 9, wherein said envelope detecting unit includes:
means for receiving said RF signal and generating a train of waveforms from low frequency components of said RF signal as said first and second envelopes in said envelope signal.

14. A rotary digital magnetic recording-reproducing apparatus, according to claim 9, wherein said first and second envelopes only represent low frequency components in said RF signal reproduced by said first and second heads, respectively.

15. A rotary digital magnetic recording-reproducing apparatus, according to claim 9, wherein said envelope detecting unit further includes a low pass filter for passing only low frequency components of said RF signal output by said first and second heads, said first and second envelopes being based only on said low frequency components.

16. A rotary digital magnetic recording-reproducing apparatus, according to claim 9, further comprising:
means for outputting a warning signal and,
means for generating an edge pulse at a beginning of each rotation cycle in order to trigger said means for outputting said warning signal to output said warning signal when said first and second latch outputs are different at a time that said edge pulse occurs.

* * * * *